United States Patent Office 3,504,106
Patented Mar. 31, 1970

3,504,106
ELECTRICAL BUSHINGS
August I. Keto, Sharpsville, Pa., assignor to Westinghouse Electric Corporation, Pittsburgh, Pa., a corporation of Pennsylvania
Filed May 2, 1969, Ser. No. 821,371
Int. Cl. H01b *17/26*
U.S. Cl. 174—152                                29 Claims

ABSTRACT OF THE DISCLOSURE

An electrical bushing assembly having an electrical conductor embedded in a cast solid insulating material, and a mounting flange. A thermoplastic insulating material is used to provide self healing, fluid seals between the electrical conductor and solid insulating material, and between metallic mounting flanges and the solid insulating material. A thermoplastic insulating material is also used to mount bushings in sealed, assembled relation with a casing, by disposing the thermoplastic material on the mounting flange, if metallic, or on the casing, and then heating the thermoplastic coating to a softening temperature while the parts to be joined are pressed together.

BACKGROUND OF THE INVENTION

Field of the invention

The invention relates in general to bushings for electrical apparatus, such as transformers, and more specifically to new and improved electrical bushings of the cast type, and to new and improved methods of constructing cast bushings and for mounting and sealing cast bushings in an opening in the casing of electrical apparatus.

Electrical insulating bushings of the type having the insulating body portion formed of a cast, thermosetting resin system, such as an epoxy resin, may be mounted on the casing of its associated electrical apparatus in many different ways, with the specific arrangement selected being determined by such factors as cost, application, and intended environment of the apparatus. Regardless of the mounting arrangement selected, all of them must mechanically secure the bushings through an opening in the casing, while providing and maintaining a fluid tight seal between the casing and the bushing. For example, air must not be able to enter or leave the casing through the bushing, such as between the mounting flange of the bushing and the casing, between the mounting flange and the insulating body portion of the bushing, or between the bushing conductor and the insulating body portion of the bushing. Further, an insulating fluid in the casing, such as oil, must not leak out of the apparatus through any of these locations. Since the end of the insulating bushing may be below the level of the insulating liquid, the interface between the conductor and insulating body portion is particularly susceptible to oil leaks.

A prior art arrangement for mounting cast type insulating bushings, casts a metallic mounting ring or flange member into the cast body portion of the bushing, the bushing is disposed through an opening in a metallic casing, and then the metallic flange is welded to the casing. This arrangement is excellent for obtaining a good mechanical structure, and for insuring that there are no leaks between the mounting flange and the casing, but fluid leaks may develop between the mounting flange and the cast body portion of the bushing, even when a gasket in the form of a resilient coating is applied to the mounting flange and cured or vulcanized, before it is embedded in the cast solid insulating material, as the welding heat may break the bond between the coating and the mounting flange, or between the coating and the cast solid insulation. Thus, it would be desirable to be able to weld metallic mounting flanges to metallic casings, without permanently impairing the seal between the metallic mounting flange and cast body portion of the bushing.

In certain applications, such as where the apparatus will be mounted underground and thus subject to flooding, welding a metallic flange to the casing is not desirable as the weld is especially susceptible to corrosion in this environment. In this instance, the entire metallic outer surface of the electrical apparatus, such as a distribution transformer casing, may be coated with a protective resin, and the bushings must be mounted and sealed while maintaining the full and continuous external protective coating. While internal hardware and gaskets may be utilized to mount and seal the bushings, it would be desirable to be able to mount and seal the bushings without costly additional mounting hardware and gaskets. Further, it would be desirable to be able to provide the necessary fluid seal without resorting to discrete gaskets, which may deteriorate with heat and time.

SUMMARY OF THE INVENTION

Briefly, the present invention utilizes thermoplastic materials to provide new and improved electrical bushings, and to provide new and improved methods of constructing bushings, as well as mounting and sealing bushings through openings in the casing of electrical apparatus. One embodiment of the invention discloses the use of thermoplastic materials for making self healing joints or gaskets between the cast thermosetting solid material of the body portion of a bushing, and a partially embedded metallic insert, such as the electrical conductor of the bushing, and a metallic mounting ring or flange. The thermoplastic material is disposed between and completely contained by the metallic insert and cast body portion of the bushing. If the thermoplastic material is heated to its softening temperature, the bond, and thus the seal, will be reestablished when the thermoplastic material cools, as it is confined and has no place to flow. Thus, welding heat on a metallic flange will not permanently impair the effectiveness of the embedded seal, such as may occur when a cured or vulcanized coating is used to form the embedded gasket.

In another embodiment of the invention, a thermoplastic coating is disposed on a metallic mounting flange of the bushing, which is used to bond the flange to a metallic casing. The casing may also have a protective coating thereon, which is thermoplastic or thermosetting, as desired. In still other embodiments an integral mounting flange, formed of cast solid insulating material, is bonded to a casing via a thermoplastic coating disposed on the casing.

BRIEF DESCRIPTION OF THE DRAWINGS

Further advantages and uses of the invention will become more apparent when considered in view of the following detailed description and drawings, in which:

FIGURE 5 is a fragmentary view, partially in section, of a bushing mounted and sealed in an opening in a casing, according to still another embodiment of the invention.

DESCRIPTION OF PREFERRED EMBODIMENTS

Figure 1:
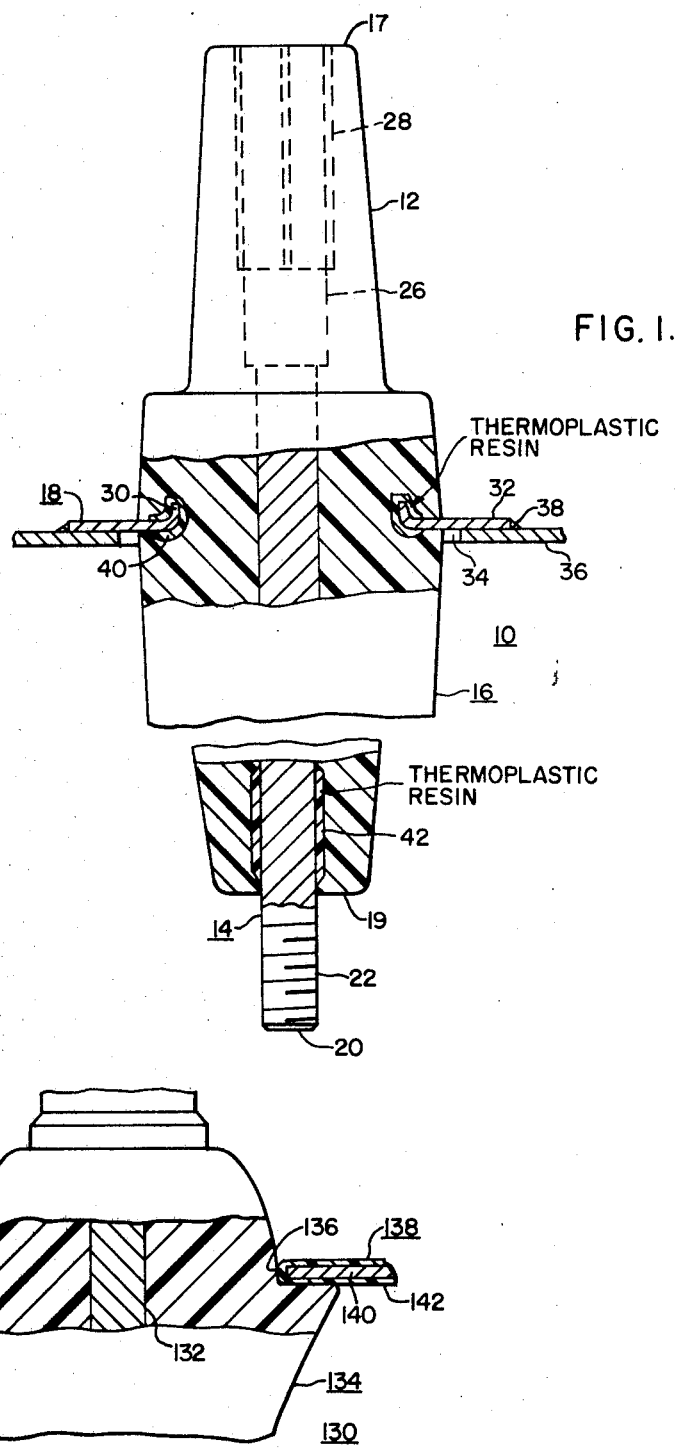
FIGURE 1 is an elevational view, partially in section, of an electrical bushing constructed according to the teachings of the invention.

Referring now to the drawings, and FIGURE 1 in particular, there is shown an electrical bushing 10, partially in section, constructed according to a first embodiment of the invention. In this embodiment, the bushing 10 is illustrated as being of the plug-in type, having a projection 12 adapted to receive a plug-in cable termination, but it is to be understood that the bushing 10 may be of any type having a metallic mounting flange adapted for welding to a metallic casing.

Specifically, bushing 10 includes an axially extending electrical conductor 14, formed of a good electrical conductor such as aluminum or copper, a substantially cylindrical insulating body member 16 formed of a cast, rigid solid insulation system, and a metallic mounting ring member or flange 18.

Body member 16 has first and second ends 17 and 19, respectively, and may be cast of any suitable resinous insulation system which has the following characteristics. It must be a good electrical insulator, weather resistant, crack resistant, rigid but not brittle, it must possess a high physical strength at ambient and elevated temperatures, and it must have a coefficient of thermal expansion which closely matches the coefficient of thermal expansion of the conductive member 14. Body member 16 is preferably cast, instead of being molded, because of the superior strength of cast resinous insulation systems over molded systems. In general, the filled epoxy cast resin systems will provide the desired characteristics, with the filler being selected to match the coefficient of thermal expansion of the filled resin system to that of the metallic conductor or insert. A finely divided filler formed of beryllium aluminum silicate has been found to be excellent in matching the coefficient of thermal expansion of the filled epoxy resin system to copper, but other fillers may be used such as quartz or silica. For 7200 volt applications where the encased end of a bushing assembly is disposed in oil, or other insulating dielectric fluid, fillers for providing arc and track resistance are usually not required. If the encased end is to be operated in air, finely divided alumina trihydrate ($Al_2O_3 \cdot 3H_2O$) may be added to obtain the desired arc and track resistance.

Conductor 14 may be solid, as illustrated, or a thin walled tube, having an end 20 adapted for connection to the encased electrical apparatus, such as by having threads 22 disposed thereon and an end 24 adapted to receive the depending conductor of plug-in connector, such as by having a slotted tubular conductive member 26 which is fixed to the end of the solid conductor 14. Resilient means 28 may be disposed to surround the slotted portion of the tubular conductive member 26, to permit the flexing of the contact fingers provided by the slots at the end of the conductor. A plug-in bushing of this general type is disclosed in co-pending application Ser. No. 489,339, filed Sept. 22, 1965, and a plug-in bushing having load break, load make and fault close in capability is disclosed in co-pending application Ser. No. 771,707, filed Oct. 30, 1968, both of which are assigned to the same assignee as the present application.

The metallic mounting ring member 18 has a central opening therein defined by a flange or curved edge of the mounting member, which is embedded within the cast body portion 16, and a radially outward extending flat disc or ring portion 32. Although not shown in FIGURE 1, the outer periphery of ring portion 32 may have a plurality of spaced extensions which extend toward the first end 17 of body member 16, having openings therein for receiving clips disposed on the cable termination to mechanically secure the cable termination in assembled relation with the bushing assembly 10. The flange 30 of the mounting ring member 18 may turn towards the first end 17 of body member 16, or towards the second end 19, as desired. The embedded flange 30 of mounting ring member 18 extends perpendicularly outward from the disc or ring portion 32, forming a smooth cylindrical surface coaxial with the axis of conductor 14. The flange extension of flanged portion 30 may be of any suitable longitudinal length, and in addition to providing a strong mechanical bond with body member 16, it also functions as a ground shield as it provides a smooth equipotential surface which is connected to the metallic casing or enclosure of the associated apparatus.

Mounting ring member 18 may be formed of any suitable material, such as steel, and is adapted for welding about its periphery to the casing of the associated electrical apparatus. For example, bushing assembly 10 may be inserted into opening 34 in a metallic casing 36, with the ring portion 32 of the mounting ring member 18 resting against the casing 36. The mounting ring member 18 may then be welded to the casing 36, as illustrated by the welding bead 38.

In forming body member 16 of bushing assembly 10, conductor 14 and mounting ring member 18 are positioned within a casting mold, prior to the introduction of a casting resin system. In order to preclude an air leak between the inside of casing 36 and the atmosphere, about the embedded portion of the mounting ring member 18, due to non-adhesion of the cast resin system to the embedded portion of the mounting ring member 18 which may develop due to the welding heat when ring member 18 is welded to casing 36, or due to differences in the coefficients of thermal expansion of mounting ring member 26 and cast body member 12, a coating 40 of a thermoplastic material is disposed on the mounting ring member 18, about the opening defined by the flanged portion 30.

It is important that the thermoplastic coating 40 be completely confined within the cast insulating body member 16, between the insulating body member 16 and the metallic mounting ring 18. In other words, the coating 40 should not extend to the outer surface of the cast solid body member 16. When casting the insulating body portion 16, the cast resin system should completely envelope the coating 40 and extend radially outward past the termination of coating 40 such that the cast resin system contacts and adheres to uncoated portions of the mounting ring 18.

It is also important that the thermoplastic material selected for coating 40 have a softening temperature which is high enough to be above the temperature to which it will be subjected during normal operation of the electrical apparatus with which it is associated, but it should be low enough that its surface will soften when the hot casting resin is introduced into the mold, to insure a good bond between the coating 40 and the cast body portion 16 of the bushing 10.

A thermoplastic material which has been found to provide excellent results in this application, is a resin of the saturated, linear polyester type. This resin may be applied by brushing or spraying, or by heating the part to be coated to about 260° C. and fluidized bed coat the required surface of the mounting ring. The surface of the coating 40 will soften at the pouring temperature of suitable epoxy casting systems, such as 100–150° C., to provide an excellent bond between the coating 40 and the insulating body member 16, when the insulating body member 16 is poured, gelled, cured, and cooled. The bonding of the two materials, the configuration of the metallic mounting ring and flange, and the shrinkage of the cast resin system upon gelling and curing, all combine to provide an excellent hermetic seal between the mounting ring member 18 and the coating 40, and between the coating 40 and the cast solid insulating body member 16.

While good bonds may be obtained between the mounting ring 18 and insulating body member 16 when using thermosetting coatings, such as vulcanized rubber coatings or resilient coatings, or other cured resinous coating systems, if the bond is broken during the welding of the mounting ring 18 to the casing 36, the bushing will be defective allowing air and moisture to leak into the casing. When using a thermoplastic material for coating 40, as taught by the invention, and by confining the coating within the cast solid insulating body member 16, a self healing gasket or seal is provided. For example, if the welding temperature softens the coating 40, the bond between the insulating body member 16 and the coating 40 will be reestablished when the coating cools and hardens. This is due to the specified construction wherein the coating is completely confined and cannot flow under the stresses which are created between the mounting ring 18 and body member 16.

A coating 42 of thermoplastic material, similar to the coating 40, may be disposed about conductor 14 for a predetermined longitudinal dimension, prior to its being embedded in the cast body member 16, in order to insure that an oil seal has been obtained between conductor 14 and body member 16. The cast body member 16 will provide an air seal, but it has been found that when the encased end is disposed in oil, oil may be forced between the outer surface of conductor 14 and the contacting portion of body member 16 due to capillary action, even when air cannot be forced through the same path. Thus, coating 42 is additional protection against this occurrence, removing the criticality from the manufacturing step which includes unloading the mold after gellation of the resin. The resin is not at peak strength at this point, and the bond between the conductor and stud may be impaired during the removal of the bushing if utmost care is not taken. While the conductor seal is shown intermediate the ends of the conductor, when the conductor includes a flanged-over portion which contacts one end of the solid insulation, the thermoplastic material may be disposed between the flange and the end of the solid insulator.

In preparing the mounting ring 18 and conductor 14 for receiving coatings 40 and 42, respectively, the areas to be coated should be degreased, and the surface prepared to tenaciously accept the coating. The surface can be roughened slightly to accomplish this purpose, either mechanically, such as by shot blasting, or chemically. If fluidized bed coating techniques are used to apply the resin, such as disclosed in U.S. Patent 3,305,812, the areas which are not to be coated are suitably masked and the part heated to about 260° C. (for thermoplastic polyesters). Fluidized bed coating is an excellent way of applying the coatings, as solventless material may be used, excellent bonds are obtained, and the desired coating thickness may be obtained through a time-temperature relationship. The coating thickness is not critical, with thicknesses in the range of .025–.035 inch being convenient when fluidized bed coating. If the coating is not smooth after the initial application thereof, a post heat may be applied to the coated part to reflow the surface of the coating.

In certain highly corrosive environments, a welded type bushing, such as the bushing 10 shown in FIGURE 1, would not be suitable, as the weld is especially susceptible to corrosion, even when using stainless steel tanks and fittings which are welding into place. An example of this type of application is where the transformer will be mounted underground in vaults which may be flooded with polluted water for extended periods of time. In applications of this nature, it is desirable to provide a protective coating on all external metallic surfaces. Gasketing the bushings has disadvantages due to the cost of the gaskets and mounting hardware required. Further, the gaskets may deteriorate and lose their effectiveness during service.

Figure 2:
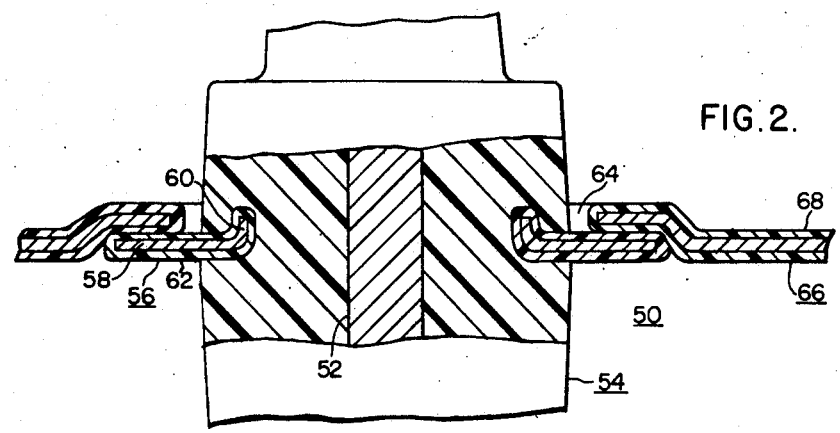
FIGURE 2 is a fragmentary view, partially in section, of an electrical bushing constructed, mounted and sealed in an opening in a casing, according to the teachings of the invention.

FIGURE 2 is a fragmentary, elevational view of a new and improved bushing assembly 50, shown partially in section, which may be used when the transformer is surface coated to prevent corrosion. Bushing assembly 50 does not require special gaskets subject to deterioration, or special mounting hardware, thus reducing the cost of the assembly.

Specifically, bushing 50 may be of the type adapted to receive a plug-in cable connector, similar to the bushing assembly 10 of FIGURE 1, or any other type of electrical bushing. Bushing assembly 50 includes an axially extending electrical conductor 52 surrounded by an insulating body member 54, which may be cast solid insulation similar to that used for bushing assembly 10 in FIGURE 1, and a metallic mounting ring member 56. Mounting ring member 56 includes a flat metallic disc or washer shaped portion 58, a central opening defined by a flange 60 which is integral with the flat portion 58, and a coating 62 of a thermoplastic material, such as a saturated linear polyester resin, as hereinbefore described relative to coating 30 in FIGURE 1. However, in this embodiment, instead of coating the mounting ring only about its opening, the entire mounting ring is uniformly coated with the thermoplastic resin, such as by utilizing fluidized bed coating techniques, or other suitable coating methods. In this embodiment it is not necessary to confine the coating 60 within the outer surface of body member 54, since the metallic flange is not to be welded.

The mounting ring 56 is coated with a thermoplastic resin, and the mounting ring and conductor 58 are placed in the casting mold. The mold, mounting ring and conductor are heated to a suitable temperature, such as 100–120° C., and the casting resin system is then introduced into the mold. The casting resin system is at an elevated temperature, such as 100–150° C., which softens the surface of coating 62 and forms a good bond and hermetic seal between the mounting ring 56 and body member 54. The cast resin system is then gelled and cured, which completes the bushing assembly 54.

The next step is to mount the bushing 50 in the opening 64 of a casing 66. The casing 66, in this application will usually have a protective coating 68 disposed thereon, which may be a thermosetting coating, such as an epoxy, or a thermoplastic coating such as a linear polyester. However, the coating 68 on casing 66 is not essential to the mounting of the bushing. If the casing is uncoated, casing 66 should be degreased and roughened mechanically or chemically adjacent its opening 64. The casing 66 may have a circular depression therein which encircles its opening, and which is sized to receive the external dimensions of the mounting ring member 56, and thus orient the bushing assembly 50 when it is disposed through opening 64 in the casing 66. When the bushing assembly 50 is disposed through the opening 64, its mounting ring member 56 contacts the casing in the depression formed about the opening. The mounting flange 56 may contact the inner side of casing 66, as illustrated, or the outer side, as desired. If disposed to contact the inner side, internal tank pressures will not attempt to disassemble the bushing from the casing 66, and thus this arrangement may be preferable.

After the mounting flange member 56 is positioned against casing 66, a pressure is applied to the casing and mounting flange to hold the two parts in firm assembled relation, and then the thermoplastic coating 62 on mounting ring 56 is heated to its softening temperature. A convenient method of heating the coating is to heat the mounting ring inductively, which will then heat and soften its coating, but other heating methods may be used. After the coating 62 softens, the pressure is maintained while the coating is allowed to cool, resulting in an excellent mechanical bond and hermetic seal between the mounting ring 56 and casing 66. If the casing 66 is coated with a thermoplastic material, the coating on casing 66 may also soften when coating 62 is heated to its softening temperature.

Since the method requires only one thermoplastic coating on one of the parts to be joined, this method may also be used in the following embodiments. First, the mounting ring 56 may be bare metal, with a thermoplastic coating on the casing 66 which is heated to its softening temperature while the mounting ring and casing are firmly held in assembled relation. Second, the coating 66 on mounting ring 56 may be thermosetting, with a thermoplastic coating on casing 66.

In the embodiments of the invention hereinbefore described, metallic mounting rings have been used, with the mounting rings having a predetermined continuous portion around their openings embedded in the insulating body member. However, in some instances it may be desirable to form mounting flanges integral with the insulating body member, such that the mounting flange is formed of the same material as the insulating body member. In this instance, the bushing may still be mounted in the casing, according to the teachings of the invention, by using a thermoplastic coating on the casing.

Figure 3:
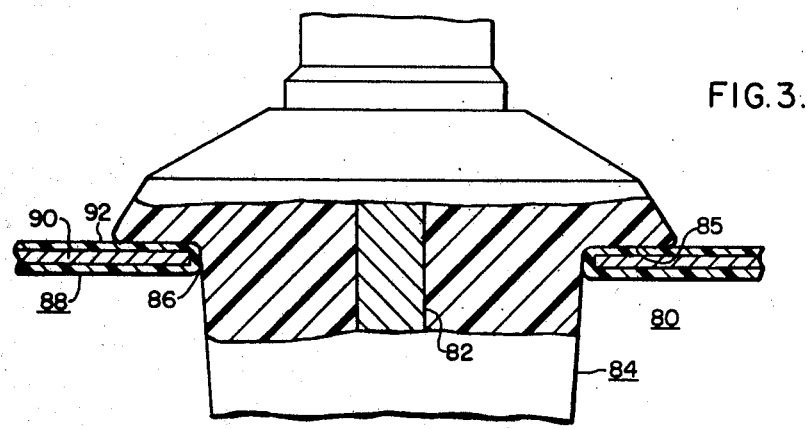
FIGURE 3 is a fragmentary view, partially in section, of an electrical bushing mounted and sealed in an opening of a casing, according to another embodiment of the invention.

FIGURE 3 is a fragmentary elevational view of a bushing assembly 80, constructed according to this embodiment of the invention. Bushing 80 includes an axially extending electrical conductor 82 surrounded by a cast solid insulating body portion 84, with a radially extending flanged member 85 being cast integrally with the body portion 84. The bushing assembly 80 is disposed through an opening 86 in a casing 88, with casing 88 having a wall or cover portion 90 coated with a thermoplastic material 92, such as the thermoplastic materials hereinbefore described. Bushing assembly 80 is disposed through the opening 86 in casing 88, with its flange portion 85 in contact with the coating 92. The flange portion 85 and casing 88 are held firmly together while the coating 92 is softened, such as by inductively heating the metallic casing wall or cover portion 90, with the pressure being maintained while the coating is cooled to provide an excellent mechanical bond and hermetic seal between the bushing 80 and casing 88.

While the embodiment of the invention shown in FIGURE 3 provides an excellent mechanical bond, in some instances it may be desirable to insure that the pressures which may be built up within the casing will not attempt to disassemble the bushing 80 from the casing 88. This may be accomplished by an embodiment of the invention shown in FIGURE 4. Like reference numerals in FIGURES 3 and 4 indicate like components.

Figure 4:
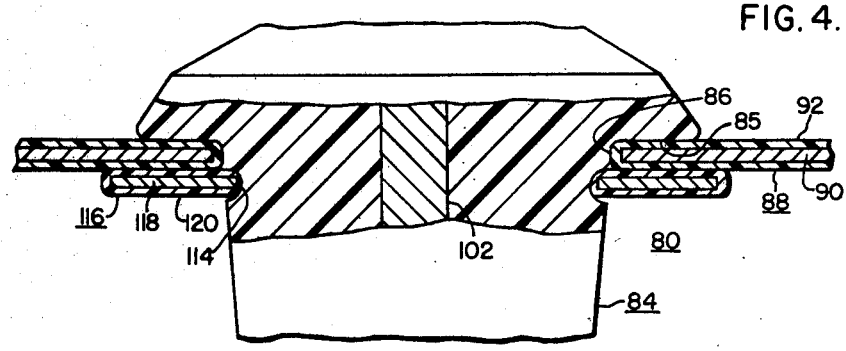
FIGURE 4 is a fragmentary view, partially in section, of a bushing mounted and sealed in an opening in a casing according to another embodiment of the invention.

More specifically, FIGURE 4 illustrates the bushing assembly 80 of FIGURE 3, modified to include an annular groove 114 which is disposed about the circumference of body portion 84 in a location which is immediately adjacent casing 88, when the bushing 80 and casing 88 are in assembled relation. The annular groove 114 cooperates with a split ring assembly 116, to hold the bushing member 80 securely in assembled relation with the casing 88, and prevent internal tank pressures from operating on the bushing in a manner to break the bond between the bushing and casing 88. The split ring assembly 116 includes first and second semi-circular portions, such as the metallic semi-circular portion 118, with both of the semi-circular portions being coated with a thermoplastic coating 120, similar to those hereinbefore described. Thus, the insulating bushing 80 is disposed through the opening 86 in the casing 88, with its flange portion 85 resting against the outside of the casing 88, and then the split ring assembly 116 is disposed to tightly encircle the insulating body portion 84, by disposing the split ring assembly in the annular groove 114. The flange portion 85, casing 88, and split ring assembly 116 are all pressed together while the thermoplastic coatings on the casing 88 and split ring assembly 116 are heated and softened, which when cooled will provide a good mechanical bond, as well as a hermetic seal between the insulating bushing 80 and the casing 88.

In those instances where it is not desirable to use an auxiliary member, such as the split ring assembly 116, to insure that the bushing will not become disassembled from the casing due to internal tank pressures, the bushing may be constructed with a configuration such as shown in FIGURE 5, whereby the integral flange portion is reversed from its normal position. Specifically, FIGURE 5 is an elevational, fragmentary view of a bushing assembly 130, shown partially in section, which includes an axially extending electrical conductor 132, and cast solid body portion 134, with the cast body portion 134 having an integral flange 146. The integral flange 146, in this embodiment, has a configuration which enables the insulating body member 134 to be disposed through an an opening 136 in a casing 138, from the inside of the casing, with the flat portion of the flange 146 resting against the inside of the casing. The casing 138 has a metallic section 140 having a coating 142 disposed thereon, which is formed of a thermoplastic material. Thus, in assembling the bushing assembly 130 with the casing 138, the bushing is disposed through opening 136 and its flange portion 146 is pressed against the inside of casing 138 while the coating 142 on the casing 138 is heated to its softening temperature. Upon cooling, a good mechanical bond and hermetic seal is formed, with the internal tank pressures only acting to increase the effectiveness of the seal, rather than attempting to force the bushing assembly from its assembled position with the casing 138.

In summary, there has been disclosed new and improved electrical bushings, and methods of mechanically securing the bushings through openings in the casing, housing or tank of associated electrical apparatus, such as covers or side wall portions of distribution transformers. One embodiment of the invention teaches partially embedding and hermetically sealing a metallic insert in a cast solid insulation system, which has a coating on a portion of the metallic insert which is embedded in the solid resin, with the coating being completely confined within the outer surface of the cast insulating bushing. The coating is thermoplastic, enabling the metallic insert to be welded to the casing, as the hermetic seal provided by the confined thermoplastic coating is self healing, in the event the welding heat reaches the softening temperature of the coating.

Other embodiments teach new and improved electrical bushing assemblies, and methods of mounting them in assembled relation with a casing, which provides hermetic seals and good mechanical mounting, without resorting to discrete gaskets and auxiliary mounting hardware. In these embodiments, a thermoplastic coating on the bushing mounting flange, casing, or both, is used to effect a good mechanical bond and hermetic seal.

Since numerous changes may be made in the above-described apparatus and different embodiments of the invention may be made without departing from the spirit thereof, it is intended that all matter contained in the foregoing description or shown in the accompanying drawings shall be interpreted as illustrative and not in a limiting sense.

I claim as my invention:
1. An electrical bushing assembly comprising:
   an insulating body member formed of solid insulation,
      electrical conductor means at least partially embedded in said body member,
   a metallic mounting member having an opening therein,
      said mounting member having a predetermined continuous portion around its opening embedded in said insulating body member,
   and a thermoplastic material disposed between and completely confined by an embedded portion of said mounting member and said insulating body member, to provide a continuous, self healing seal.
2. The electrical bushing assembly of claim 1 wherein the thermoplastic material includes a saturated, linear polyester resin.
3. The electrical bushing assembly of claim 1 wherein the metallic mounting member includes an integral flange about its opening, which is embedded in the insulating body member.

4. The electrical bushing assembly of claim 1 including thermoplastic material disposed between, and completely confined by an embedded portion of the electrical conductor means and the insulating body member.

5. The electrical bushing assembly of claim 4 wherein the thermoplastic material includes a saturated, linear polyester resin.

6. An electrical bushing assembly comprising:
an insulating body member formed of solid insulation,
electrical conductor means at least partially embedded in said body member,
and a thermoplastic material disposed between and completely confined by an embedded portion of said electrical conductor and said insulating body member, to provide a continuous self healing seal.

7. A method of constructing an insulating bushing, and mounting and sealing the bushing in an opening in a casing, comprising the steps of:
providing a metallic mounting member having an opening therein,
coating the mounting member with a thermoplastic material,
providing an electrical conductor,
placing the electrical conductor in the opening in the metallic mounting member,
casting a thermosettable resin system about the electrical conductor, with a predetermined continuous portion of the mounting member about its opening being within the resin system,
curing the thermosettable resin system to a solid, to form the insulating body portion of the bushing and to secure the mounting member therein,
providing a casing having an opening therein,
inserting the insulating body portion of the bushing through the opening in the casing, with its coated mounting member against the casing,
pressing the coated mounting member against the casing,
heating the coating on the mounting member to soften the coating,
and cooling the coating to form a mechanical bond and seal between the mounting member and casing.

8. The method of claim 7 including the step of coating at least the portion of the casing which contacts the coated mounting member with a resin, prior to the step of inserting the body portion of the bushing through the opening in the casing.

9. The method of claim 8 wherein the resin applied to the casing is a thermoplastic material.

10. The method of claim 8 wherein the resin applied to the casing is a thermosetting material.

11. A method of claim 7 wherein the coated mounting member contacts and is bonded to the inside of the casing.

12. A method of mounting and sealing a bushing in an opening in a casing, comprising the steps of:
providing an electrical bushing having an electrical conductor and an insulating body portion having an integral mounting flange, formed of cast solid thermosetting insulating material,
providing a casing having an opening therein,
coating at least a portion of the casing about its opening,
inserting the electrical bushing through the opening in the casing with its mounting flange disposed against the casing,
pressing the mounting flange of the bushing against the casing,
heating the coating on the casing to its softening temperature,
and cooling the coating to form a mechanical bond and seal between the flange and casing.

13. The method of claim 12 wherein the mounting flange contacts the inside of the casing.

14. The method of claim 12 wherein the mounting flange contacts the outside of the casing.

15. The method of claim 12 wherein the mounting flange contacts the outside of the casing, and the insulating body portion has an annular groove therein within and adjacent to the casing, and including the steps of providing a split ring assembly, coating the split ring assembly with a thermoplastic material, assembling the split ring assembly about the insulating body portion in the annular groove, with one of its coated sides being adjacent the casing, and wherein the heating step softens the coatings on the split ring, and the cooling step forms a bond between the split ring and the casing.

16. An electrical bushing and casing assembly, comprising:
an electrical bushing having an insulating body portion, an electrical conductor, and a metallic mounting member having an opening therein, said metallic mounting member having a coating of thermoplastic material thereon, with a continuous portion of said coated mounting member, adjacent its opening, being embedded in said insulating body portion,
a casing having an opening therein,
said electrical bushing being disposed in the opening of said casing, with the thermoplasticc coating on said metallic flange member being bonded to said casing.

17. The electrical bushing and casing assembly of claim 16 wherein said casing has a coating of insulating material disposed thereon, at least where the coated mounting member contacts the casing.

18. The electrical bushing and casing assembly of claim 16 wherein the thermoplastic material is a saturated, linear polyester.

19. The electrical bushing and casing assembly of claim 16 wherein the mounting member is bonded to the inside of the casing.

20. The electrical bushing and casing assembly of claim 16 wherein the mounting member is bonded to the outside of the casing.

21. An electrical bushing and casing assembly, comprising:
an electrical bushing having an insulating body portion, an electrical conductor, and a mounting flange integral with said insulating body portion,
a casing having an opening therein,
a coating of thermoplastic material disposed on said casing, at least about the opening of said casing, on a predetermined side of the casing,
said electrical bushing being disposed in the opening of said casing, with the thermoplastic coating on said casing bonding the mounting flange of said insulating body portion to the casing.

22. The electrical bushing and casing assembly of claim 21 wherein the mounting flange is bonded to the inside of the casing.

23. The electrical bushing and casing assembly of claim 21 wherein the mounting flange is bonded to the outside of the casing.

24. The electrical bushing and casing assembly of claim 21 wherein the insulating body portion of the bushing has an annular groove therein, adjacent the opposite side of the casing to which the mounting flange is bonded, and including a split ring assembled about the insulating body portion, in the annular groove, said split ring having a coating of thermoplastic material thereon which bonds the split ring assembly to the casing.

25. A bushing assembly comprising:
an insulating body member formed of solid insulation,
a metallic member having an opening therein, said metallic member having a predetermined continuous portion around its opening embedded in said insulating body member,
and a thermoplastic material disposed between and completely confined by an embedded portion of said metallic member and said insulating body member, to provide a continuous, self healing seal.

26. A method of constructing an insulating bushing, and mounting and sealing the bushing in an opening in a casing, comprising the steps of:
provide a first metallic member having an opening therein,
coating the first metallic member with a thermoplastic material,
providing a second metallic member,
placing the second metallic member in the opening in the first metallic member,
casting a resin system about at least a portion of the second metallic member, with a predetermined continuous portion of the first metallic member about its opening being within the resin system,
curing the resin system to a solid, to form the insulating body portion of the bushing and to secure the first metallic member therein,
providing a casing having an opening therein,
placing the insulating body portion of the bushing in the opening in the casing, with its coated first metallic member against the casing,
pressing the coated first metallic member against the casing,
heating the coating on the first metallic member to soften the coating,
and cooling the coating to form a mechanical bond and seal between the first metallic member and casing.

27. A method of mounting and sealing a bushing in an opening in a casing, comprising the steps of:
providing a bushing having an insulating body portion having an integral mounting flange, formed of cast solid thermosetting insulating material, and a metallic insert at least partially confined by said insulating body portion,
providing a casing having an opening therein,
coating at least a portion of the casing about its opening,
placing the bushing in the opening in the casing with its mounting flange disposed against the casing,
pressing the mounting flange of the bushing against the casing,
heating the coating adjacent the opening in the casing to its softening temperature,
and cooling the coating to form a mechanical bond and seal between the mounting flange and casing.

28. A bushing and casing assembly, comprising:
a bushing having an insulating body portion, a metallic insert at least partially confined by the insulating body portion, and a metallic mounting member having an opening therein, said metallic mounting member having a coating of thermoplastic material thereon, with a continuous portion of said coated mounting member, adjacent its opening, being embedded in said insulating body portion,
a casing having an opening therein,
said bushing being disposed in the opening of said casing, with the thermoplastic coating on said metallic flange member being bonded to said casing.

29. A bushing and casing assembly, comprising:
a bushing having an insulating body portion, a metallic insert at least partially confined by the insulating body portion, and a mounting flange integral with said insulating body portion,
a casing having an opening therein,
a coating of thermoplastic material disposed on said casing, at least about the opening of said casing, on a predetermined side of the casing,
said bushing being disposed in the opening of said casing, with the thermoplastic coating on said casing bonding the mounting flange of said insulating body portion to the casing.

References Cited

UNITED STATES PATENTS

| | | | |
|---|---|---|---|
| 2,356,831 | 8/1944 | De Monte et al. | 174—153 |
| 3,318,995 | 5/1967 | Buckley et al. | 174—142 |
| 3,388,212 | 6/1968 | Nichols et al. | 174—153 |
| 3,422,392 | 1/1969 | Woods | 174—152 |

FOREIGN PATENTS 696,201   8/1953   Great Britain.

LARAMIE E. ASKIN, Primary Examiner

U.S. Cl. X.R.

29—458